United States Patent [19]

Motz

[11] Patent Number: 5,031,843
[45] Date of Patent: Jul. 16, 1991

[54] CRUSHING CORAL LIMESTONE USING WATER ADDITION

[75] Inventor: Jerome C. Motz, Milwaukee, Wis.

[73] Assignee: Nordberg Inc., Milwaukee, Wis.

[21] Appl. No.: 508,771

[22] Filed: Apr. 12, 1990

Related U.S. Application Data

[63] Continuation of Ser. No. 336,728, Apr. 12, 1989, abandoned.

[51] Int. Cl.$^5$ .................. B02C 2/00; B02C 19/12; B02C 23/18
[52] U.S. Cl. .................................................. 241/21
[58] Field of Search .............. 241/38, 46 R, 46.02, 241/62, 207–216, 21, 15, 16

[56] References Cited

U.S. PATENT DOCUMENTS 4,750,679  6/1988  Karra et al. ................ 241/41

OTHER PUBLICATIONS

"Crushing Under Water Flush", Karra.
"Hydrocrushing of Coal", Coal Research Bureau, Babu and Leonard.

*Primary Examiner*—Joseph M. Gorski
*Attorney, Agent, or Firm*—Welsh & Katz, Ltd.

[57] ABSTRACT

A method for comminuting coral limestone is disclosed. The method utilizes a conical crusher including a housing with a vertically adjustable bowl, a feed assembly and a conical head gyrating with the bowl to define a crushing cavity therebetween, and a waterbox disposed above the feed assembly for creating a low water content slurry of limestone and water and for introducing the slurry into the crushing cavity for more efficient production of cuboidal product.

4 Claims, 2 Drawing Sheets

CRUSHING CORAL LIMESTONE USING WATER ADDITION

This is a continuation, of application Ser. No. 07/336,728, filed Apr. 12, 1989, and now abandoned.

BACKGROUND OF THE INVENTION

The present invention relates to an apparatus and method for comminuting coral limestone, and specifically relates to the use of a waterbox having an overflow weir disposed above the feed assembly of a conical crusher so as to create a controlled water/coral limestone slurry and to introduce such slurry into the crushing cavity of the conical crusher.

Coral limestone is a variety of limestone which is mined in the Southeastern portion of the United States, principally in Florida. Coral limestone is crushed and sized for use in various construction operations, such as aggregate for concrete structures, roadbeds and drainage fields. These uses for coral limestone require the particles to be cuboidal in shape for optimum results.

Up to the present time, coral limestone could not be crushed successfully in a conical crusher, normally employed as either a secondary or tertiary crusher in a comminution circuit, due to the buildup of wet fines on the mantle, bowl liner and feed chute surfaces The wet fines form a paste-like substance which may accumulate to the extent that no discharge of crushed product can take place. This paste-like substance which clogs the crushing cavity is due in large part to the 8–9% moisture level of the coral limestone as it is taken from the ground. Accordingly, conical crushers have generally not been used to crush coral limestone.

Conventional attempts to solve the problem of comminuting coral limestone involve the use of horizontal shaft impactor crushers after the material has been stockpiled to allow excess water to drain off. This method is less than satisfactory because the horizontal shaft impactor produces more fines at a higher operating cost and thus is inherently less efficient than a conical crusher.

Commonly assigned U.S. Pat. Nos. 4,750,679 and 4,671,464 disclose an apparatus and method for injecting water into the crushing cavity of a conical crusher and adjustments to the crusher to produce a flakier product which is easily and more efficiently ground in a mill. In "Crushing Under Water Flush", by Karra, Engineering and Mining Journal, May, 1982, pp. 103–106, the creation of a low (4%) solids content limestone slurry in a jaw crusher is discussed, and high solids content slurries, i.e., more than 60% solids, are described as being less energy efficient than crushing without water. In addition, low solids content mineral slurries are commercially undesirable due to the high cost of handling and preparing a final commercial product from the crushed product.

Consequently, there is a need for a mechanism enabling the efficient use of a conical crusher in the comminution of coral limestone. Such mechanism should enable the conical crusher to produce a relatively large volume of cuboidal products of the type desired for construction grade aggregate, and should minimize or eliminate the buildup of wet fines in the crusher.

SUMMARY OF THE INVENTION

Accordingly, a system for crushing coral limestone using a water addition is provided, wherein a waterbox preferably having an overflow weir is positioned above the feed assembly of a conical crusher and is adjusted so that a coral limestone slurry of relatively low water content is provided, which then overflows the weir, falls into the crusher feed chute and ultimately is fed into the crushing cavity between the gyrating conical head and the fixed bowl. The conical crusher is normally a secondary or tertiary crusher used either in an open or closed comminution circuit.

More specifically, the waterbox of the present invention has a mixing compartment wherein the coral limestone feed material is introduced and is mixed with water to create a low water content slurry, preferably in the approximate range of 10–35% water. Basically, depending upon the moisture content of the mined coral limestone, just enough extra water is added to the feed material in the slurry mixing tank to form a slurry which will be easily passed through the crusher without plugging. The waterbox is provided with valves which meter the amount of water used to create the slurry, as well as an optional additional water source for facilitating the flow of slurry through the crusher. Once the level of slurry in the storage tank reaches the rim of the overflow weir, the material spills into a slurry feed portion of the waterbox, from where it flows by gravity through the crusher feed chute and into the crushing cavity.

DESCRIPTION OF THE PREFERRED EMBODIMENT

Figure 1:
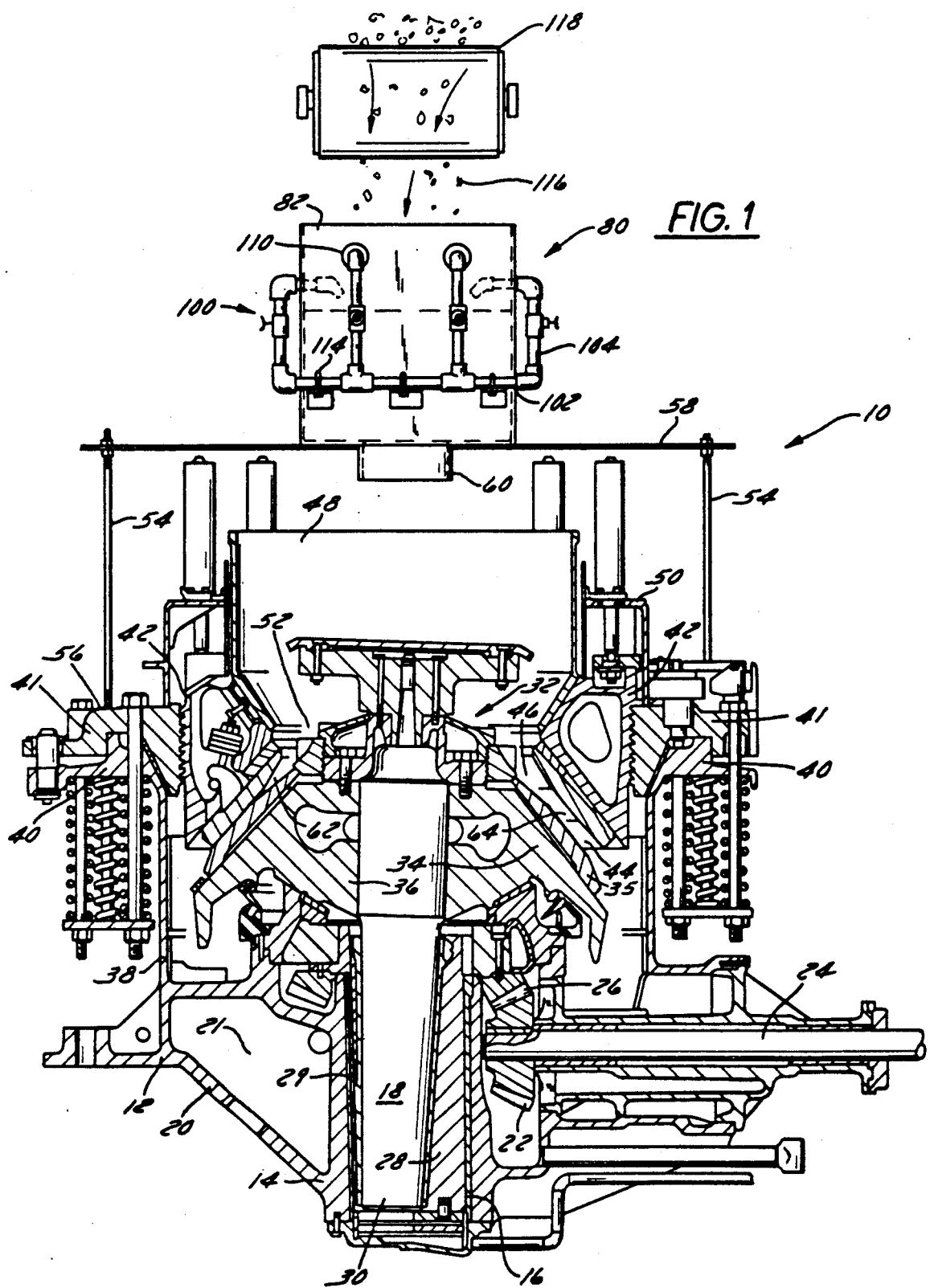
FIG. 1 is a vertical sectional elevational view of a crusher incorporating a waterbox as called for by the present invention, the waterbox shown in a front elevational view.

Referring now to the drawings, FIG. 1 depicts a simplified version of a conical crusher which may be emploYed with the present invention. It should be understood that the present invention is not restricted to this particular conical crusher, but may be practiced with minor adjustment upon any of several conventional conical crushers. The crusher, generally indicated at 10, includes a frame 12 having a central hub 14 formed from a cast steel member having an upwardly projecting vertical bore 16 adapted to receive a generally cylindrical support shaft 18. A plurality of frame arms 20 are provided to support the central hub 14 within an outer portion of the frame 12. An open area 21 between the frame arms 20 is provided for removal of crushed material. The frame 12 extends outwardly from the hub 14 to enclose a drive pinion 22. The drive pinion 22 is driven by a countershaft 24 which is powered by a conventional electric motor, drive belt and pulley system (not shown). The drive pinion 22 engages an annular gear 26 which is connected to an eccentric 28 having a socket 29 configured to accommodate the lower end 30 of the support shaft 18. Axial rotation of the eccentric 28 results in a gyrating motion of the shaft 18.

The support shaft 18 extends vertically beyond the eccentric 28 and supports the head assembly 32, which is attached to the shaft 18. The head assembly 32 includes a head member 34 having a generally conical configuration and being provided with a mantle 35 positioned about the exterior of the head member. Extending inwardly of the head member 34 is a support member 36 which engages the outer surface of the shaft 18.

A generally tubular main frame housing or shell 38 projects upwardly from the frame 12 and terminates at an upper end having an annular beveled portion known as the adjustment ring seat 40. An adjustment ring 41 is positioned directly above and supported by the seat 40. The inner annular surface of the adjustment ring 41 is helically threaded to receive a complementary threaded outer annular surface of a crusher bowl 42 Axial rotation of the crusher bowl 42 thus adjusts the position thereof relative to the ring 41 and changes the crusher setting, i.e., the relative position of the head member 34 and the bowl 42, the latter component being fixed during crusher operation. More specifically, the crusher discharge setting is the gap 44 between the head mantle 35 and a bowl liner 46. The bowl 42 is further provided with a hopper 48 positioned within the adjustment cap 50, which is bolted at various spaced positions along a top surface of the adjustment ring 41 and rests on the upper surface of the bowl 42. A central opening 52 in the hopper 48 accommodates the passage of feed material, and the bowl liner 46 provides the crushing surface against which the gyrating head mantle 35 forces incoming material to perform the comminution process.

A plurality of vertically projecting support shafts 54 are fixed to an upper surface 56 of the ring 41 for securing a feed platform 58 above the hopper 48 The feed platform 58 includes a feed inlet chute 60 which, in the preferred embodiment depends toward the hopper 48.

The operation of the crusher 10 involves the gyration of the head 34 within the confines of the bowl liner 46. This gyration defines a cycle during which, relative to an imaginary reference point on the bowl liner 46, the head 34 alternates between a closed crushing position shown at 62 and an open position shown at 64. Incoming feed material is crushed until it is small enough to pass through the gap 44 in the position 64. Since the head 34 is continually gyrating, some material is always being either crushed or passed after crushing, through the open position 64 and out the open area 21 around the frame arms 20.

Figure 2:
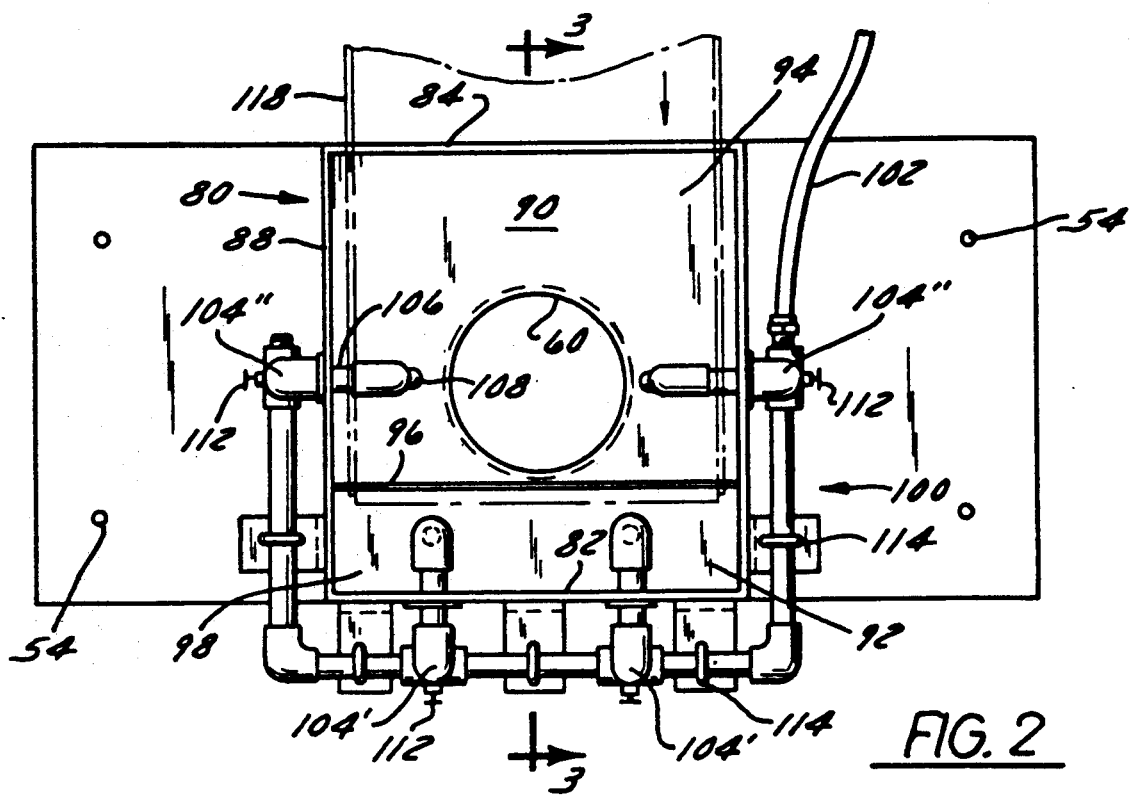
FIG. 2 is an overhead plan view of the waterbox shown in FIG. 1.
Figure 3:
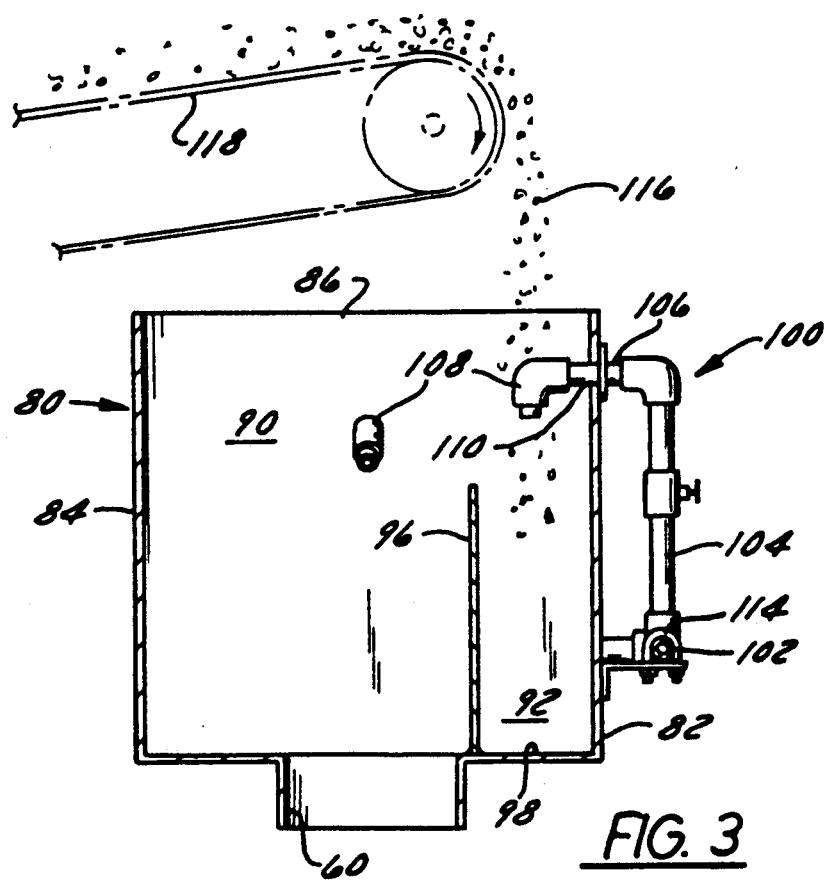
FIG. 3 is a vertical sectional view taken along the line 3—3 ;of FIG. 2 and in the direction indicated generally.

Referring now to FIGS. 1-3, a waterbox designated generally 80 is secured upon the feed platform 58. The waterbox 80 in the preferred embodiment is generally rectangular in configuration, although other equivalent configurations are contemplated. The waterbox 80 includes front and rear walls 82 and 84 as well as first and second side walls 86 and 88. The walls 82, 84, 86 and 88 define an interior portion 90 of the waterbox 80 which is made up of a slurry mixing tank portion 92 and a slurry feed portion 94. Although it is not essential, an overflow weir 96 is preferably provided to separate the mixing tank portion 92 from the slurry feed portion 94.

Referring now to FIGS. 2 and 3, the weir 96 is situated within the interior 90 of the waterbox 80 so that a floor 98, actually the top of the platform 58, is defined which is not breached by the feed inlet chute 60. Thus, the slurry mixing tank portion 92 is assembled to be substantially watertight. The height of the weir 96 will be determined by the particular application in which the crusher is employed; however, a minimum height is preferred which permits the retention of a layer of slurry upon the floor 98. This retained slurry cushions the platform 58 as well as the waterbox 80 from the impact shock of incoming feed material.

The waterbox 80 also includes a water supply apparatus 100. The apparatus 100 includes a water feed pipeline 102 to which are connected a plurality of spray pipes 104. Each pipe 104 projects vertically from the pipeline 102 and has an inwardly projecting nipple portion 106, which in turn has a downwardly directed nozzle 108. The nipple portions 106 project through corresponding openings 110 in the walls 82-88. Each vertical spray pipe 104 is provided with its own manually operated or remotely controlled valve 112.

Referring now to FIG. 2, two of the spray pipes 104, designated 104' are disposed to direct water into the slurry mixing tank portion 92, whereas at least one and preferably two of the pipes 104, designated 104" are disposed to direct water into the slurry feed portion 94. The water supply pipeline 102 is secured to the walls 82-88 by conventional U-bolts 114 or other conventional type of pipe mounting device.

In operation, and referring to FIG. 1, the coral limestone feed material 116 is supplied to the crusher 10 by a feed conveyor or feeder 118 which transports the limestone feed from a primary crusher, a secondary crusher, or stockpile (not shown), depending on the design of the particular comminution circuit. The feed conveyor 118 is disposed so that the majority of the feed material falls directly into the slurry mixing tank 92 and not into the slurry feed portion 94. In applications where the weir 96 is provided, the shock of incoming material into the waterbox 80 is decreased by the retained slurry, thus reducing the wear on the waterbox 80, as well as on the crusher 10. Sufficient water is supplied through the water spray pipes 104' so that a slurry feed mixture is created which is of low water content It has been found that best results are obtained when the slurry water content in the tank 92 is approximately between 10-35%, with approximately 25% being preferred.

The slurry will eventually overflow the weir 96 and fall into the feed portion 94, where it then flows through the feed inlet chute 60 and into the opening 52. Due to the water content of the slurry, limestone paste is not able to collect on the mantle 35 or the bowl liner 46 or between those components, or in the feed chute 60, and is more readily flushed through the crusher 10 than is the case when "dry", coral limestone containing 3 to 10% moisture or recently mined limestone is fed through a "dry" crusher. If necessary, the water spray pipes 104" may be adjusted to direct additional water into the slurry feed portion 94 to facilitate the flow of the slurry through the opening 52. The adjustment of water through the spray pipes 104 is made by means of the valves 112.

Thus, the present waterbox, when combined with the conical crusher as disclosed hereinabove, provides a means for producing a low water/coral limestone slurry which, when passed through the conical crusher, enables high production rates of cuboidal products Through the apparatus of the invention, the production of limestone "paste" which clogs conventional crushers has been eliminated and crusher efficiency has been increased significantly.

While a particular embodiment of the conical crusher with waterfeed addition of the invention has been shown and described, it will be appreciated by those skilled in the art that changes and modifications may be made thereto without departing from the invention in its broader aspects and as set forth in the following claims.

We claim:

1. A method for comminuting coral limestone in a conical crusher having a feed chute and a crushing cavity defined by a conical head gyrating within a vertically adjustable bowl, comprising the steps of:

introducing coral limestone having an approximate 8-9% moisture level as mined into a waterbox having an overflow weir and situated above a feed platform of the conical crusher;

adding water to the coral limestone in the waterbox, thereby creating a low water content slurry of approximately 10% to 35% water content in said waterbox;

introducing said slurry from said waterbox into the feed chute, and ultimately into the crushing cavity of the crusher, thereby preventing formation of limestone paste in the crushing cavity during comminution of said limestone; and comminuting said limestone in the conical crusher, thereby forming a product having a cuboidal shape for sue as aggregate.

2. A method for comminuting coral limestone in a conical crusher having a feed platform with a chute, a crushing cavity defined by a conical head gyrating within a vertically adjustable bowl, a waterbox secured to said feed platform and having a floor, a mixing tank portion, a slurry feed portion being in communication with said feed chute and said crushing cavity, and an overflow weir disposed within said waterbox to separate said mixing tank portion from said slurry feed portion, said weir being at least of a height which retains a cushioning layer of water and limestone on said floor, comprising the steps of:

introducing a source of coral limestone having a moisture level of approximately 8-9% as mined into said mixing tank portion of said waterbox;

adding sufficient water to said coral limestone in said mixing tank portion, thereby forming a low water content limestone slurry of approximately 10% to 35% water content which will be passed through said crusher without plugging;

spilling said slurry over said weir into said feed portion and ultimately into said crushing cavity; and crushing said slurry in said crusher, thereby forming a cuboidal product for use as aggregate.

3. The method as defined in claim 2 further including adding enough water so that said slurry has a water content of approximately 25%.

4. The method as defined in claim 1 further including adding enough water so that said slurry has a water content of approximately 25%.

* * * * *

UNITED STATES PATENT AND TRADEMARK OFFICE
CERTIFICATE OF CORRECTION

PATENT NO. : 5,031,843

DATED : July 16, 1991

INVENTOR(S) : Jerome C. Motz et al.

It is certified that error appears in the above-identified patent and that said Letters Patent is hereby corrected as shown below:

On the title page:

Add inventors --Ivan Pavlovic, Menomonee Falls; Anthony J. Magerowski, Milwaukee, Wis.; and Thomas W. Curley, Roswell, Georgia--

Column 1, line 27, after "surfaces" insert a period;

Column 2, line 43, delete "emploYed" and insert --employed--;

Column 3, line 64, after "crusher" insert --10--;

Column 4, line 6, delete "downwardlY" and insert --downwardly--;

Column 4, lines 9-10, delete "manuallY" and insert --manually--;

UNITED STATES PATENT AND TRADEMARK OFFICE
CERTIFICATE OF CORRECTION

PATENT NO.  : 5,031,843

DATED       : July 16, 1991

INVENTOR(S) : Jerome C. Motz et al.

It is certified that error appears in the above-identified patent and that said Letters Patent is hereby corrected as shown below:

Column 4, line 10, delete "remotelY" and insert --remotely--;

Column 4, line 34, after "content" insert a period; and

Column 4, line 57, after "products" insert a period.

In the Claims:

Column 5, line 21, delete "sue" and insert --use--.

Signed and Sealed this

First Day of December, 1992

*Attest:*

DOUGLAS B. COMER

*Attesting Officer*      Acting Commissioner of Patents and Trademarks